Nov. 23, 1926.  
R. H. LONG  
1,607,899

LIQUID DISPENSING APPARATUS

Filed July 26, 1923

Patented Nov. 23, 1926.

1,607,899

UNITED STATES PATENT OFFICE.

RICHARD H. LONG, OF ALAMEDA, CALIFORNIA, ASSIGNOR OF TWO-FIFTHS TO EDWIN R. WILLARD, OF BERKELEY, CALIFORNIA.

LIQUID-DISPENSING APPARATUS.

Application filed July 26, 1923. Serial No. 653,958.

The general object of this invention is to provide a means of accurately dispensing a predetermined quantity of the liquid for which the apparatus is used, by providing adjustable electric contacts on the dial of a liquid meter, and control buttons which operate electric relays which in turn control an electrically operated valve and pump of the dispenser.

One form of the invention is illustrated in the accompaning drawing in which—

Figure 1 is a diagrammatical view showing the various parts of the invention; Fig. 2 is a fragmentary and detail plan, on an enlarged scale, of one of the adjustable meter contacts and Fig. 3 is a cross-section at the said adjustable meter contact, the contact being shown in full; Fig. 4 is a diagrammatic view in elevation of the "stop" button of my apparatus, the contacts thereof being normally closed; and Fig. 5 is a similar elevation, but is that of the operating buttons, the contacts thereof being normally open.

The liquid to be dispensed may be forced through the meter "A" by an electrically driven pump 11, which is connected in a circuit S indicated in Fig. 1; or a head for forcing the liquid through the meter may be produced by any other suitable means. After leaving the meter, the liquid flows through an electrically operated valve "B" to the delivery nozzle at the end of the pipe line or hose.

In the meter A, which may be of any approved type, are contacts H arranged on the surface of a dial N, and the meter is further provided wtih a pointer or hand R secured in any suitable manner to a shaft of the meter and adapted to make contact with the contacts H, which are numbered successively 1 to 10 in correspondence with the buttons D in order to indicate the number of gallons of liquid to be delivered. The main electric circuit T, in which relays C are connected, is ordinarily open at the buttons D, as is shown diagrammatically at $d$ in Fig. 5, but is closed as soon as a button D is depressed, the button contacts being automatically held open, as is common in a certain type of electric-contact devices and therefore needs no further illustration.

Included in the circuit T is also the magnetic winding F of the electric valve B, by which contacts G in the circuit S are controlled, so that, when the valve B is open, the contacts G are closed and the pump 11 is forcing liquid to the meter A and, when the valve is closed, the contacts G are open and the pump thus prevented from operating. Stop contacts $p$, controlled by a button P, are also included and so arranged in the circuit T that normally the contacts $p$ are in contact, but are held open when the button P is depressed.

In each of the circuits controlled by the buttons D, I provide contacts E, which are operated by armatures on the relays C and are interlocks of the buttons D, so that the buttons D need be depressed only momentarily in order to render a delivery. A shunt is also provided for each relay circuit by connecting one end of a line, as at $a$ in the circuit controlled by the button $D^{10}$, and the other end of the line with the respective contact H, as at $b$, which indicates the connection with the respective contact 10 in Fig. 1, so that the shunted circuit will follow the path indicated by the arrows $e$ to $f$ to the winding F.

It should be observed that the hand R is normally set at 0 or 10, in order to indicate also, when a complete revolution of the hand has been made, that ten gallons of liquid have passed through the meter.

The operation is as follows: If, for example, the button $D^{10}$ is depressed, contact at $d$ for that button is made and the current is shunted at $a$, so that it flows in the direction of the arrows $f$ to the winding F of the valve B, thus energizing the winding and causing the valve B to open and in its turn to close the contacts G in the circuit S and thereby to start operation of the pump 11. Liquid immediately begins to flow through the meter A and causes the hand R to revolve in a clock-wise direction. As soon as the hand ceases to contact with the contact H at 0, the shunt circuit is broken, and the current is caused to flow through the winding of the relay C controlled by the button $D^{10}$, thereby closing the contacts E for the same relay and rendering the depression of the button no longer necessary. Of course, it is necessary to hold the button $D^{10}$ depressed until the hand R has moved off the contact point so that the contact at 0 is broken in order to assure continuation of the operation when the button $D^{10}$ is released. This, however, requires but a fraction of a second. The current will thereafter flow in the direction of the arrow $c$ through the contacts E and through the relay winding in the direction of the unmarked arrows, through the winding F and will thus continue to hold the valve B open and at the same time to keep the pump 11 in operation.

If it is desired that a full measure of ten gallons of the liquid be delivered, the operator simply allows the hand to continue revolving, as the movement of the hand is directly controlled by the flow of the liquid through the meter. When the hand again reaches the contact H at 0 or 10, the current flows in the direction of the arrow $c$ and through the contacts E to the shunt line at $a$ to the winding F. Immediately thereafter, since the current is diverted from the relay C, controlled by the $D^{10}$ button, and the relay thus is de-energized, its contacts E open, so that the circuit through the winding F is broken and causes the valve B to close and thereby to open the circuit S for the pump 11, which thus stops so that the liquid ceases to flow through the meter A.

After the $D^{10}$ button has been depressed, should it be desired to change the delivery to a smaller quantity than the ten gallons indicated on the $D^{10}$ button, for example, to one gallon and a half of liquid, the operator simply depresses the stop button P when the hand R has reached a position midway between the contacts H marked 1 and 2, as indicated in Fig. 1. The contacts $p$ are then opened and thereby also the circuit T, with the result that the liquid immediately ceases to flow through the meter.

Again, should it be desired, after the operator has depressed a button D, that a larger quantity of liquid be delivered, it is only necessary to let the hand R reach the contact H corresponding with the number on the depressed button D, and then depress the button indicating the larger quantity. For instance, if the operator has depressed the $D^1$ button, the hand R will stop at the contact $H^1$. If it then should be desired to change the quantity of the delivery to five gallons, the operator depresses the button $D^5$, and the meter will start to operate, as before, and the hand R will stop at the contact $H^5$, thus indicating that a total of five gallons of liquid has been delivered.

It is obvious that the revolving hand R does not stop except at the contact H corresponding with the number of the depressed D button, unless the stop button P is depressed, as the contacts H, over which the hand passes before it reaches the corresponding contact, are then in open circuits, because the respective contacts E in those circuits are open, while for the selected quantity of liquid the contacts E remain closed and thus close the circuit T until the hand R reaches the corresponding contact H on the dial N.

As has already been mentioned, the starting point or the normal position of the hand R, indicated by dotted lines in Fig. 1, is always at 0 or 10, except as described hereinbefore. Therefore, before beginning an operation, the hand is manually turned to the 0 point on the dial.

In order to accurately determine the quantity of liquid to be delivered, the contacts "H" may be made adjustable. In this connection, and as one simple means, I prefer slotting the meter dial as at "J" to receive the shank "K" (Figs. 2 and 3) of the contact button "H," and use the nut "L" for clamping the contact in adjusted position. The nut "L" may also be used to anchor the wire terminal "M" to the contact and dial.

It is of course understood that the meter dial should be made from insulating material.

In case the amount to be delivered is found excessive after an operating button has been depressed, the button marked "Stop" will open the circuit through the coil "F" of the electrically operated valve "B", causing the valve to close instantly and the flow to cease.

It is evident that operating buttons "D" may be electric contacts as shown in the drawing or may be extensions to the armatures of relays "C" and operated manually.

In the foregoing description I have described an apparatus in which the electric valve "B" actuates contacts "G" to operate the pump, but obviously the contacts "G" may be omitted if the liquid flow through the meter is under gas pressure or a gravity head.

What I claim as my invention is:

1. A liquid-dispensing apparatus comprising a meter; means for forcing liquid through said meter; means for predetermining the quantity of liquid to be delivered from the meter; a valve adapted to control the flow of liquid from said meter, said valve being controlled by electrically operated means connected in circuit with said predetermining means; and electric contacts on the meter connected in said circuit for controlling the shut-off of said valve and said liquid-forcing means.

2. A liquid-dispensing apparatus comprising a meter; means for forcing liquid through said meter; means for predetermining the quantity of liquid to be delivered from the meter; a valve adapted to control the flow of liquid from said meter, said valve being controlled by electrically operated means connected in circuit with said predetermining means; and adjustable electric contacts on the meter connected in said circuit for controlling the shut-off of said valve and said liquid-forcing means.

3. A liquid-dispensing apparatus comprising a meter; means for forcing liquid through the meter; a valve adapted to control the flow of liquid from said meter, said valve being controlled by electrically operated means; control relays connected in circuit with said valve-controlling means; and electric contacts on the meter, said contacts being respectively connected with the windings of said relays, and each relay being adapted to control the circuit of said valve-controlling means and said liquid-forcing means.

4. A liquid-dispensing apparatus comprising a meter; means for forcing liquid through said meter; a valve adapted to control the flow of liquid from said meter, said valve being controlled by electrically-operated means; electric contacts on the meter, said contacts being connected in circuit with said valve-controlling means for controlling the shut-off of said valve; and stop means connected in circuit with said valve-controlling means for closing the valve independently of said meter contacts.

5. A liquid-dispensing apparatus comprising a meter; a valve adapted to control the flow of liquid from said meter, said valve being controlled by electrically operated means; means for predetermining the quantity of liquid to be delivered from the meter, said predetermining means being connected in circuit with said valve-controlling means; and means on the meter connected in circuit with said predetermining means for controlling the shut-off of said valve.

RICHARD H. LONG.